United States Patent
Yoshifuji

Patent Number: 5,825,301
Date of Patent: Oct. 20, 1998

[54] CROSS CONNECT APPARATUS WITH ROUTED PATH PROTECTING FUNCTION

[75] Inventor: Yuuki Yoshifuji, Tokyo, Japan

[73] Assignee: NEC Corporation, Tokyo, Japan

[21] Appl. No.: 645,390

[22] Filed: May 13, 1996

[30] Foreign Application Priority Data

May 11, 1995 [JP] Japan .................................. 7-112840

[51] Int. Cl.⁶ ............................ G06F 13/00; H04Q 11/00
[52] U.S. Cl. .................... 340/826; 340/827; 340/825.79; 340/825.8; 370/351; 370/355; 370/356; 370/357; 370/360; 379/242; 379/268; 379/272; 379/273
[58] Field of Search ..................... 340/826, 827, 340/825.79, 825.8; 370/351, 360, 355–357; 379/242, 268, 272, 273

[56] References Cited

U.S. PATENT DOCUMENTS

| | | | |
|---|---|---|---|
| 5,182,554 | 1/1993 | Kaiser et al. | 340/826 |
| 5,243,334 | 9/1993 | Georgiou et al. | 340/825.03 |
| 5,245,603 | 9/1993 | Newman | 370/54 |
| 5,487,155 | 1/1996 | Drewry et al. | 395/311 |

FOREIGN PATENT DOCUMENTS

| | | |
|---|---|---|
| 2272953 | 11/1990 | Japan. |
| A 4-10891 | of 1992 | Japan. |
| 4277952 | 10/1992 | Japan. |
| A 5-300554 | of 1993 | Japan. |
| 5260081 | 10/1993 | Japan. |
| A 6-315177 | of 1994 | Japan. |
| A 6-70347 | of 1994 | Japan. |

OTHER PUBLICATIONS

International Publication No. WO 88/06831, published 7 Sep. 1988.

International Publication No. WO 84/04644.

*Primary Examiner*—Michael Horabik
*Assistant Examiner*—Yonel Beaulieu
*Attorney, Agent, or Firm*—Sughrue, Mion, Zinn, Macpeak & Seas, PLLC

[57] ABSTRACT

In a cross connect apparatus, a switch section includes a plurality of switches and having n input terminals and m output terminals. A control section reads a current connection information indicative of a current connection state of the switch section in response to a connection command, and determines based on the read connection information, whether it is allowed to establish a connection state of the switch section designated by the connection command. When it is determined to be allowed, the control section establishes a new connection state of the switch section designated by the connection command.

12 Claims, 12 Drawing Sheets

CROSS CONNECT APPARATUS WITH ROUTED PATH PROTECTING FUNCTION

BACKGROUND OF THE INVENTION

1. Field of the Invention

The present invention relates to a cross connect apparatus and, more particularly, to a cross connect apparatus having a function to protect a path routed already.

2. Description of Related Art

FIG. 1 is a flow chart illustrating the operation of an example of conventional cross connect apparatus. For convenience of description, signal flow is shown in the figure in addition to the operation flow. Referring to FIG. 1, the conventional cross connect apparatus has a host control unit 104 and, for example, two matrix switch sections connected to one after another. Each of the matrix switch sections includes a matrix switch connection information sections 100 or 101 and a control section 102 or 103 for controlling the corresponding connection information section 100 or 101. The host control unit 104 controls the control sections 102 and 103.

Connection information is transmitted from the host control unit 104 to the control sections 102 and 103. In response to the connection information, the control sections 102 and 103 reply with respective responses to the host control unit 104. In a step S100, the host control unit 104 determines whether the responses are received from all the control sections 102 and 103. If it is confirmed that the responses are received from all the control sections 102 and 103, the host control unit 104 outputs a trigger signal as an instruction to the control sections 102 and 103. In response to the instruction, each of the control sections 102 and 103 controls the corresponding matrix switch connection information section 100 or 101 to establish new connection of matrix switches. If the host control section 104 cannot receive the responses from all the control sections 102 and 103, the answer is determined to be negative in the step S100. The host control unit 104 outputs a trigger signal to the control sections 102 and 103 not to establish the new connection of matrix switches.

Various connection systems of the matrix switch are known. For instance, in Japanese Laid Open Patent Disclosure (JP-A-Hei4-277952), it is disclosed that a switch section is provided for each interface section so that a system outage due to failure of a single switch is prevented. In Japanese Laid Open Patent Disclosure (JP-A-Hei2-272953), the technique is disclosed in which a communication content is prevented from being erroneously transmitted to an undesired line upon the line connection. Further, it is described in Japanese Laid Open Patent Disclosure (JP-A-Hei5-260081), cross connect apparatuses at both ends of a line are designated as first and second specific apparatuses, and when the first specific apparatus generates a failure signal, a predetermined algorithm is executed to switch a line.

However, there are the following problems in the above conventional cross connect apparatuses. FIGS. 2 and 3 are diagrams illustrating examples of connection state in the cross connect apparatus. For simplification of description, assume that a conventional cross connect apparatus has two matrix switches A and B connected one after another and each has three input terminals 1 to 3 and three output terminals 1 to 3. Referring to FIG. 2, in an initial connection state, the input terminal 3 is connected to an output terminal 1 in the matrix switch A and an input terminal 1 is connected to an output terminal 1 in the matrix switch B. As a result, a signal supplied to the input terminal 3 of the matrix switch A is outputted from the output terminal 1 of the matrix switch B. Assume that information indicative of the above connection state is lost. Also, assume that the host control unit 104 is required to connect the input terminal 1 of the matrix switch A to an output terminal 2 of the matrix switch B. In this case, the host control unit 104 should issue a command to the control unit for the matrix switch A to connect the input terminal 1 to the output terminal 2 in the matrix switch A and a command to the control unit for the matrix switch B to connect the input terminal 2 to the output terminal 2 in the matrix switch B. However, since the connection state information is lost, there is a case that the host control unit 104 issues a command to the control unit for the matrix switch A to connect the input terminal 1 to the output terminal 1 in the matrix switch A and a command to the control unit for the matrix switch B to connect the input terminal 1 to the output terminal 2 in the matrix switch B. In this case, the output terminal 1 of the matrix switch A is connected to the input terminals 1 and 3, i.e., an erroneous connection is established. Note that the connection state in which one input terminal is connected to a plurality of output terminals indicates a broadcasting connection state and is valid. Next, referring to FIG. 3, assume that the host control unit 104 recognizes, regardless of the above initial connection state, that the input terminal 3 of the matrix switch A is connected to the output terminal 2 of the matrix switch B. In this case, if the host control unit 104 issues a command to the control unit for the matrix switch A to disconnect between the input terminal 3 and the output terminal 1 in the matrix switch A and a command to the control unit for the matrix switch B to disconnect between the input terminal 1 and the output terminal 2 in the matrix switch B, erroneous disconnection is established because the input terminal 1 and the output terminal 1 are not disconnected in the matrix switch B. In this manner, erroneous connection cannot be prevented in the conventional cross connect apparatus.

SUMMARY OF THE INVENTION

The present invention has, as an object, to provide a method and apparatus for confirming a current connection state in a matrix switch section so that a path routed already in the matrix switch section is protected from erroneous connection and disconnection.

In order to achieve an aspect of the present invention, a cross connect apparatus includes a switch section including a plurality of switches and having n input terminals and m output terminals, and a control section for reading a current connection information indicative of a current connection state of the switch section in response to a connection command, for determining based on the read connection information, whether it is allowed to establish a connection state of the switch section designated by the connection command, and for establishing a new connection state of the switch section designated by the connection command when it is determined to be allowed.

The control section may include a connection establishing section and a connection control section. In this case, the connection establishing section establishes the new connection state of the switch section designated by the connection command in response to a new connection information and holds the new connection information, and the connection control section reads the current connection information from the connection establishing section in response to the connection command, determines based on the read current connection information, whether it is allowed to establish the new connection state of the switch section, and outputs the new connection information to the connection establishing section when it is determined to be allowed. Alternatively, the switch section may include a plurality of switch subsections, and the control section may includes a connection establishing section including a plurality of connection establishing subsections respectively provided for the plurality of switch subsections, a connection control section including a plurality of connection control subsections respectively provided for the plurality of connection establishing subsections, and a main control section for controlling the connection control subsections. In this case, each of the plurality of connection establishing subsections establishes the new connection state of the corresponding switch section in response to the new connection information and holds the new connection information. Each of the plurality of connection control subsections reads the current connection information from the corresponding connection establishing subsection in response to a read command, determines based on the read current connection information, whether it is allowed to establish the new connection state of the corresponding switch subsection, outputs a response when it is determined to be allowed, and outputs the new connection information to the corresponding connection establishing subsection in response to a connection control data. Further, the main controller outputs the read command to the plurality of connection control subsections in response to the connection command, and outputs the connection control data to the plurality of connection control subsections when the responses are received from the plurality of switch control subsections.

The connection command may be a command for establishing a new connection or for disconnecting a current connection state.

In order to achieve another aspect of the present invention, a method of protecting a connection state in a cross connect apparatus, includes the steps of:

reading a current connection information indicative of a current connection state of a switch section in response to a connection command;

determining based on the read current connection information, whether it is allowed to establish a new connection state of the switch section designated by the connection command;

establishing the new connection state of the switch section designated by the connection command when it is determined to be allowed; and discarding the connection command when it is determined not to be allowed.

DESCRIPTION OF THE PREFERRED EMBODIMENTS

The cross connect apparatus of the present invention will be described with reference to the accompanying drawings.

Figure 1:
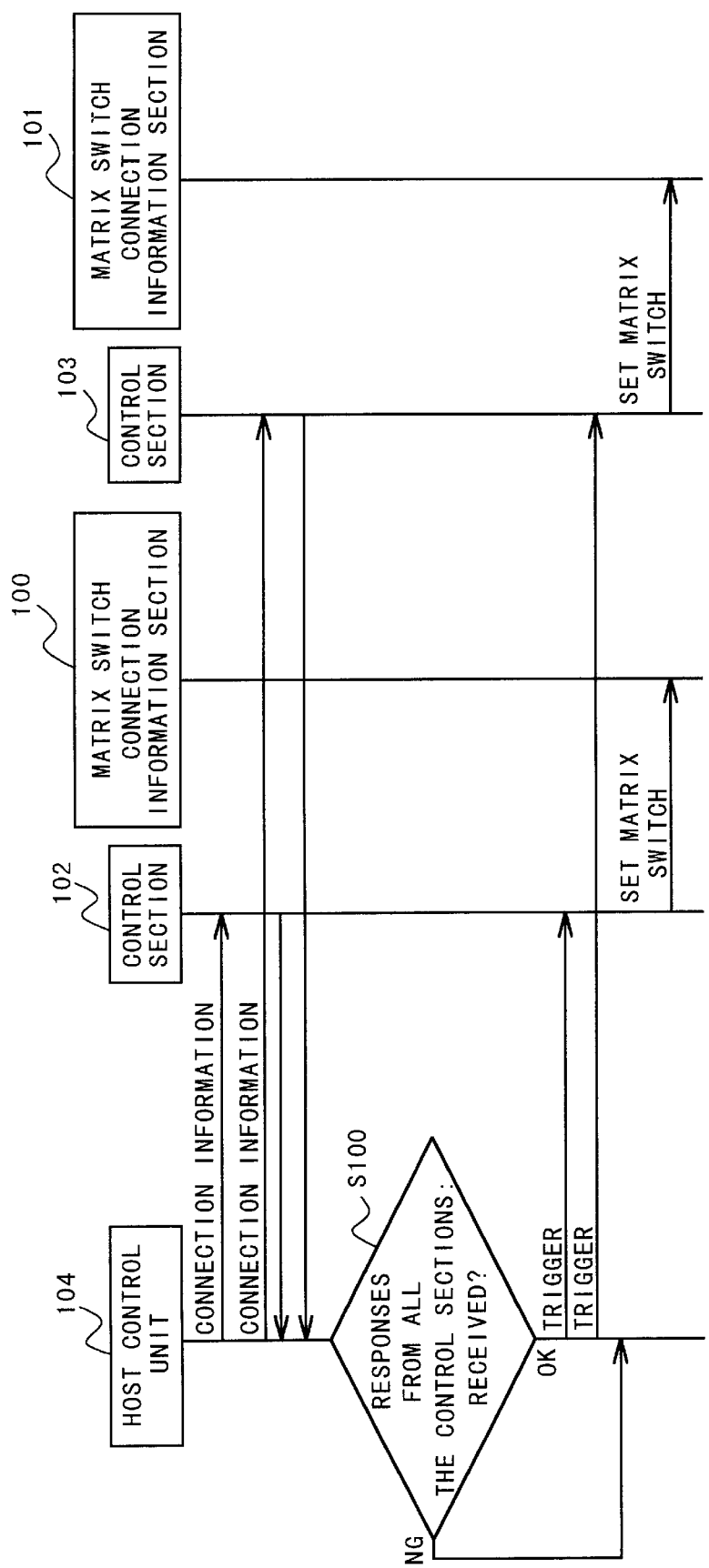
FIG. 1 is a diagram illustrating an operation of a conventional cross connect apparatus.
Figure 2:
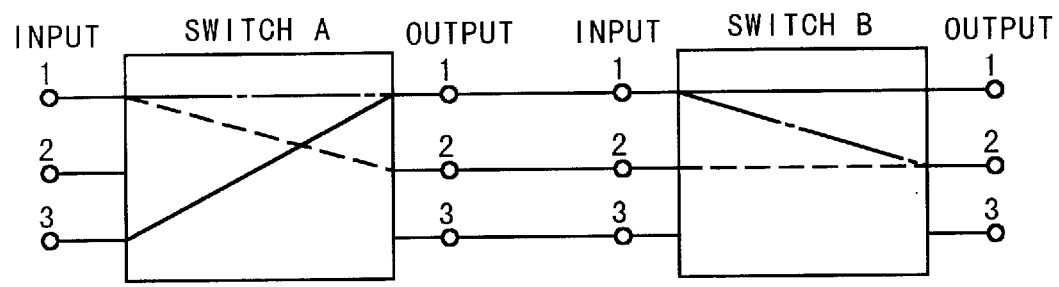
FIGS. 2 and 3 are connection examples in the conventional cross connect apparatus.
Figure 3:
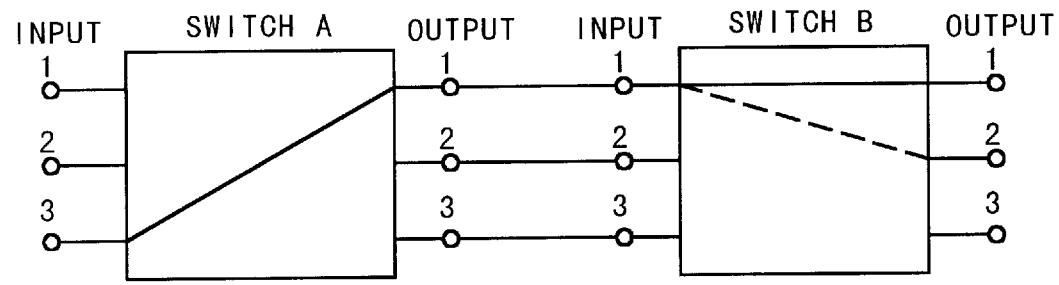
Figure 4:
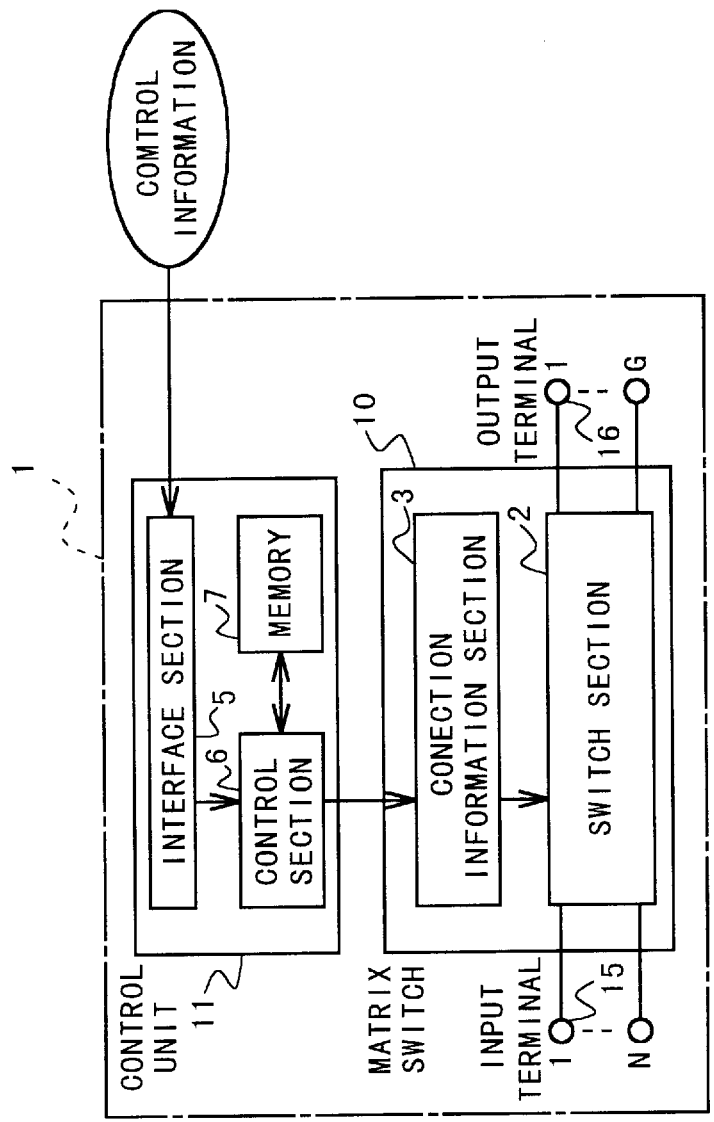
FIG. 4 is a block diagram illustrating the structure of a cross connection apparatus according to a first embodiment of the present invention.

FIG. 4 is a block diagram illustrating the structure of the cross connect apparatus according to the first embodiment of the present invention. Referring to FIG. 4, the cross connect apparatus 1 is composed of a matrix switch section 10 and a control unit 11. The matrix switch section 10 is composed of a switch section 2 having a plurality of switches arranged in a matrix manner and a connection information section 3 for driving the switch section 2 to establish a desired line connection state in response to a connection information and storing the connection information indicative of the connection state of the switch section 2. The switch section 2 has N input terminals 15 and G output terminals 16 (N and G are positive integers). The control unit 11 is composed of an interface section 5, a control section 6 for controlling the connection information section 3 to establish the desired line connection in the switch section 2 in accordance with control information or connection information inputted from an external unit (not shown) via the interface section 5, and a memory 7 for storing the control information. In the above cross connect apparatus 1, it is an erroneous connection state that a plurality of input terminals 15 are connected to a single output terminals 16. On the contrary, the connection state in which a plurality of output terminals 16 are connected to a single input terminal 15 is a valid state used to broadcast information.

Figure 5:
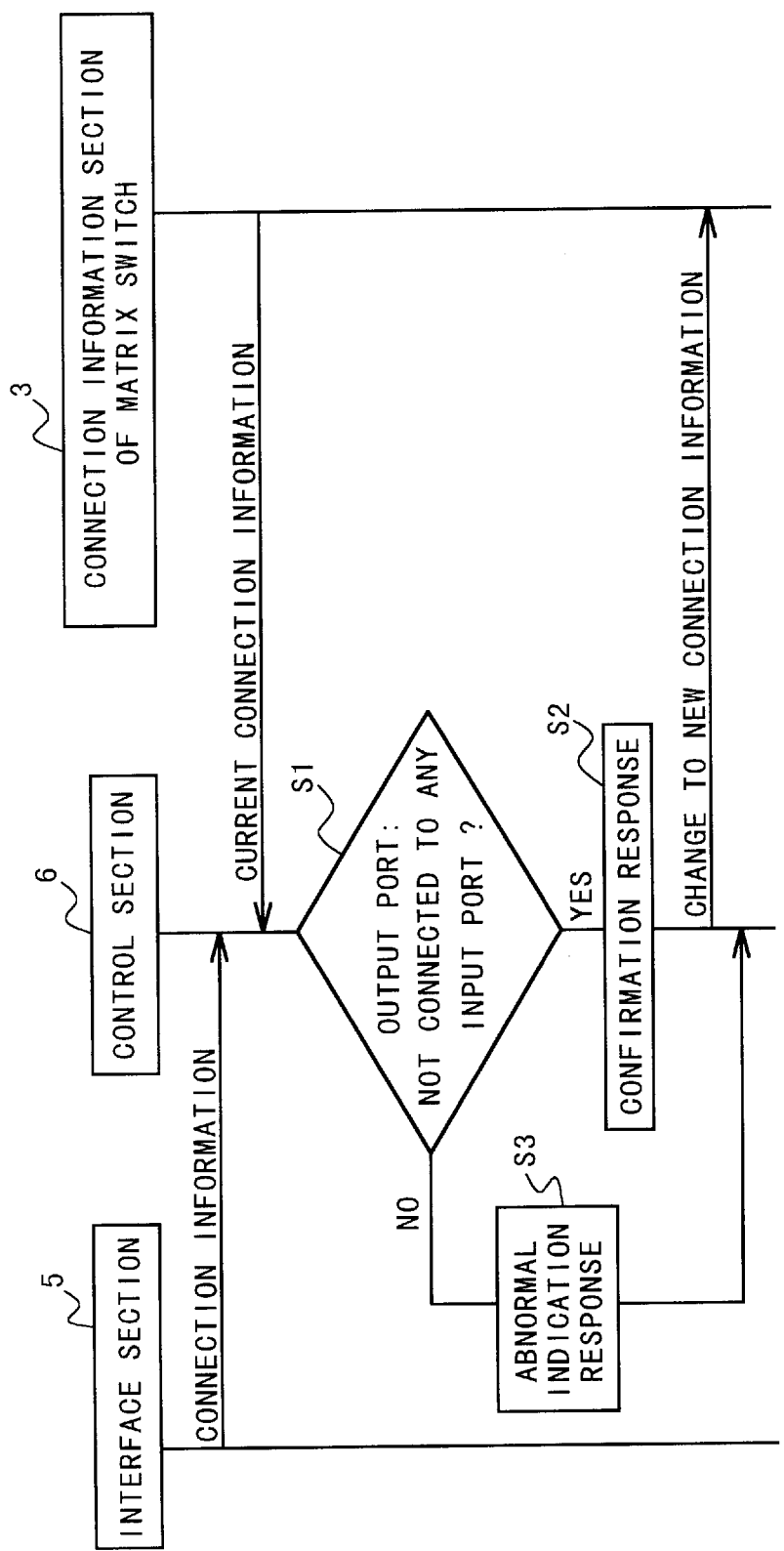
FIGS. 5 and 6 are flow charts illustrating the operations of the cross connect apparatus according to the first embodiment.

Next, the operation of the cross connect apparatus 1 according to the first embodiment of the present invention will be described below. FIG. 5 is a flow chart for explaining the operation of the cross connect apparatus 1. In the flow chart, signal flow is also illustrated in addition to the control flow. Referring to FIG. 5, new connection information or control information to command establishment of a new connection state of the switch section 2 is inputted from the external unit to the control section 6 via the interface section 5. The control section 6 stores the new connection information in the memory 7. At the same time, the control section 7 issues a read instruction to the connection information section 3 to read current connection information indicative of a current connection state of the switch section 2 from the connection information section 3. In a step S1, the control section 6 determines whether the output port or output terminal 16 designated by the connection information externally supplied is not connected to any input port or input terminal 15. When it is confirmed at the step S1 that the designated output port or output terminal is not connected to any input port or input terminal, the operation proceeds to a step S2. In the step S2, the control section 6 outputs a confirmation response to the external unit via the interface section 5 and supplies the new connection information to the connection information section 3 to instruct the connection information section 3 to establish a new connection state of the switch section 2 in response to the connection information. In this case, the connection information section 3 stores or holds the new connection information. When it is determined at the step S1 that the designated output port or output terminal is already connected to any input port or input terminal, an abnormal state indicating response is outputted to the external unit in a step S3.

Figure 6:
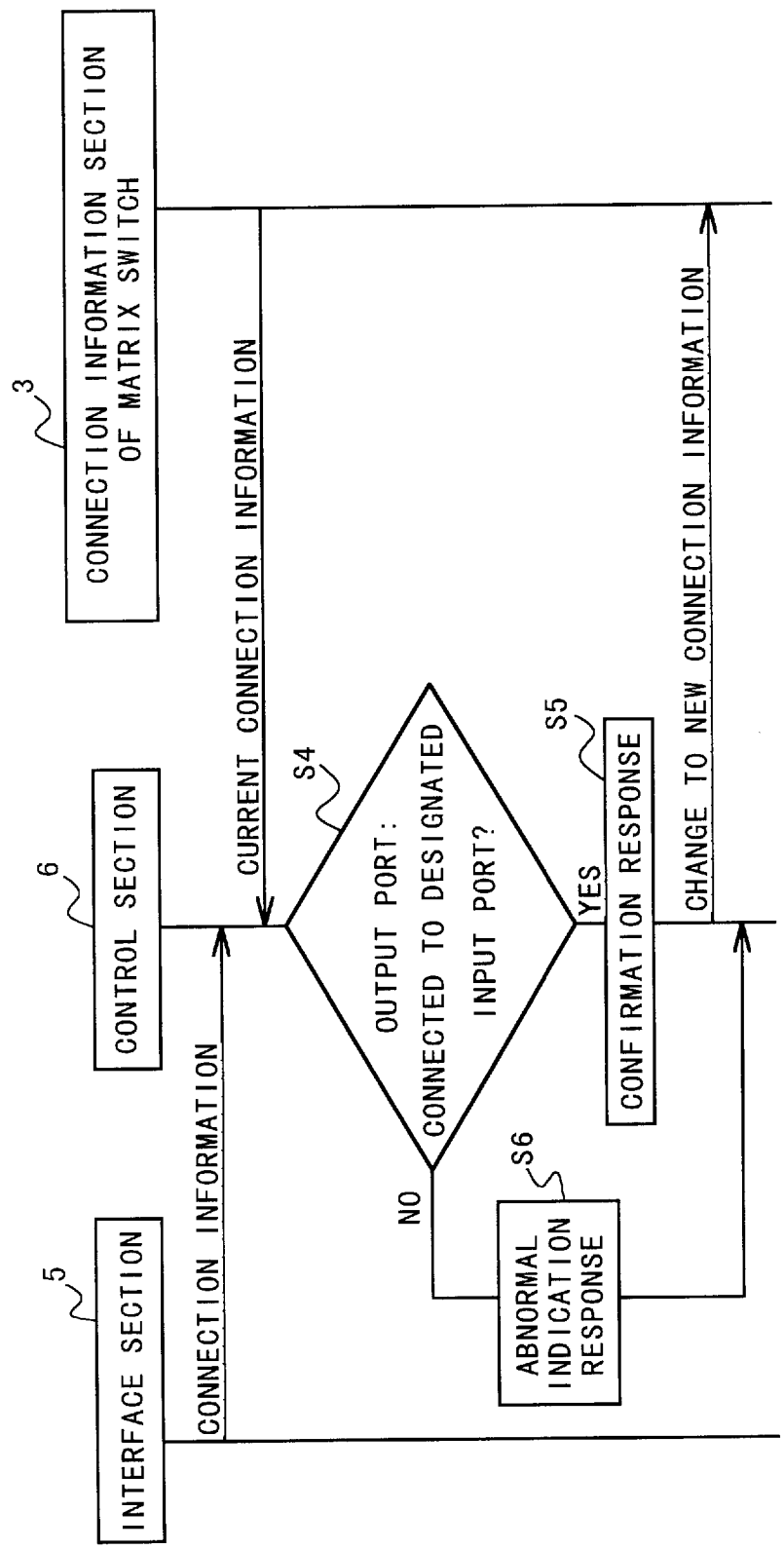

Next, the operation in the disconnect control will be described with reference to FIG. 6. The processing from the reception of the new connection information to the read of the current connection information is the same as in the above description. In the step S4, the control section 6 determines whether an output port 16 and input port 15 designated by the new connection information are connected. If it is confirmed that the output port 16 and input port 15 designated by the new connection information are connected, the operation proceeds to the step S5. In the step S5, the control section 6 supplies the confirmation response to the external unit via the interface section 5 and outputs the new connection information to the connection information section 3 to instruct the connection information section 3 to establish the new connection state of the switch section 2, i.e., disconnect between the input terminal 15 and the output terminal 16. The new connection information is stored in the connection information section 3.

Figure 7:
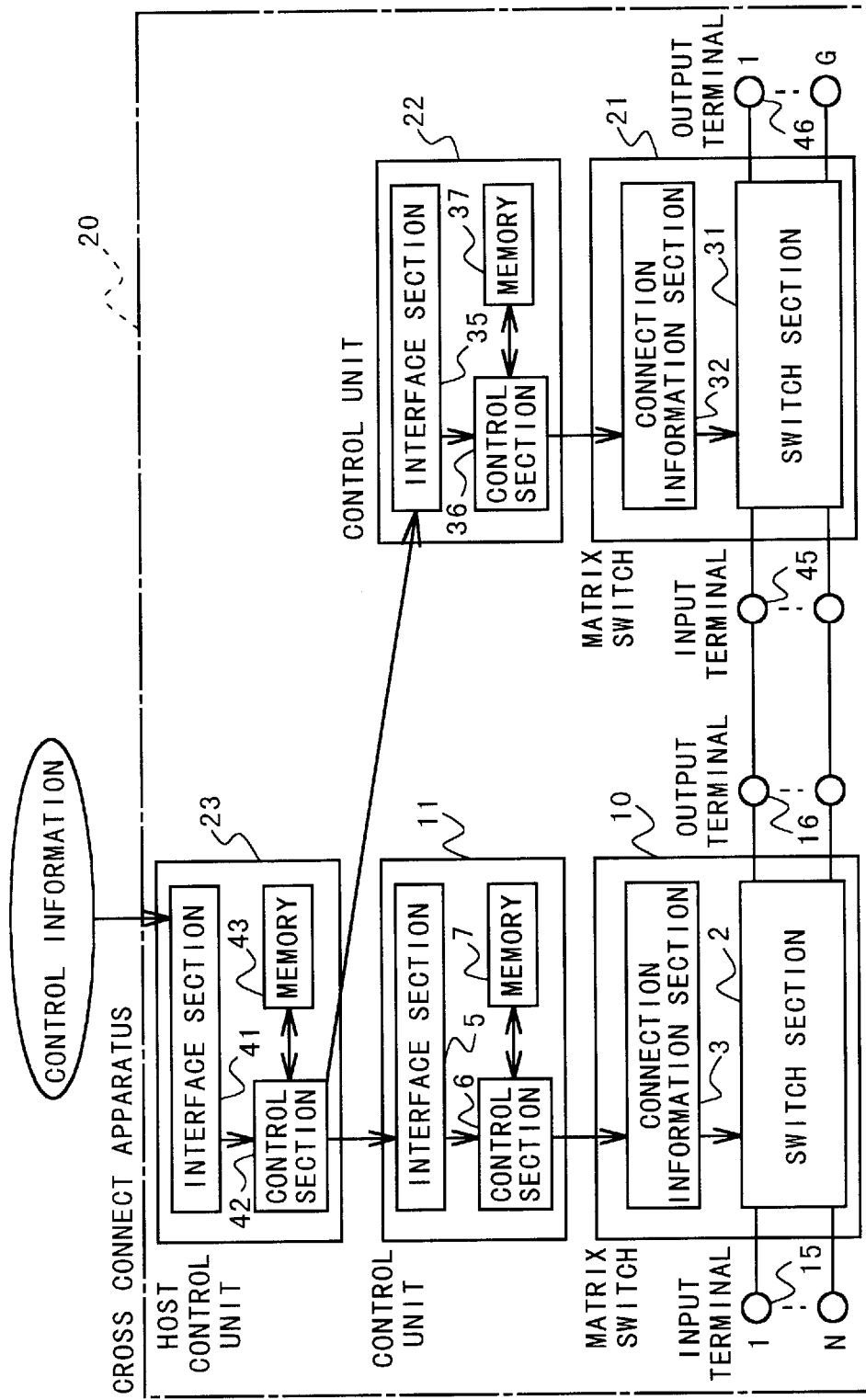
FIG. 7 is a block diagram illustrating the structure of a cross connection apparatus according to a second embodiment of the present invention.

Next, the cross connect system according to the second embodiment of the present invention will be described with reference to FIG. 7. FIG. 7 is a block diagram illustrating the structure of cross connect system according to the second embodiment of the present invention. Referring to FIG. 7, the cross connect system 20 is composed of a host control unit 23, control units 11 and 22 and matrix switch sections 10 and 21. The control unit 11 and matrix switch section 10 are the same as those in the first embodiment. The host control unit 23 is composed of an interface section 41, a control section 42 for receiving a new control information or connection information from an external unit via the interface section 41 to control the control units 11 and 22, and a memory 43 for storing the received new control information. The matrix switch section 21 has the same structure as the matrix switch section 10 and is composed of a switch section 31 having a plurality of switches arranged in a matrix manner and a connection information section 32 for driving the switch section 31 to establish a desired connection state in the switch section 31 in response to the new connection information and storing the new connection information. The control unit 22 has the same structure as the control unit 11 and is composed of an interface section 35, a control section 36 for controlling the matrix switch section 21 in accordance with connection information inputted from the host control unit 23 via the interface section 35, and a memory 37 for storing the new connection information. The switch section 2 has N input terminals 15 and the switch section 31 has G output terminals 46 (N and G are positive integers). The number of output terminals 16 of the switch section 2 is equal to that of input terminals 45 of the switch section 31 in the embodiment.

Figure 8:
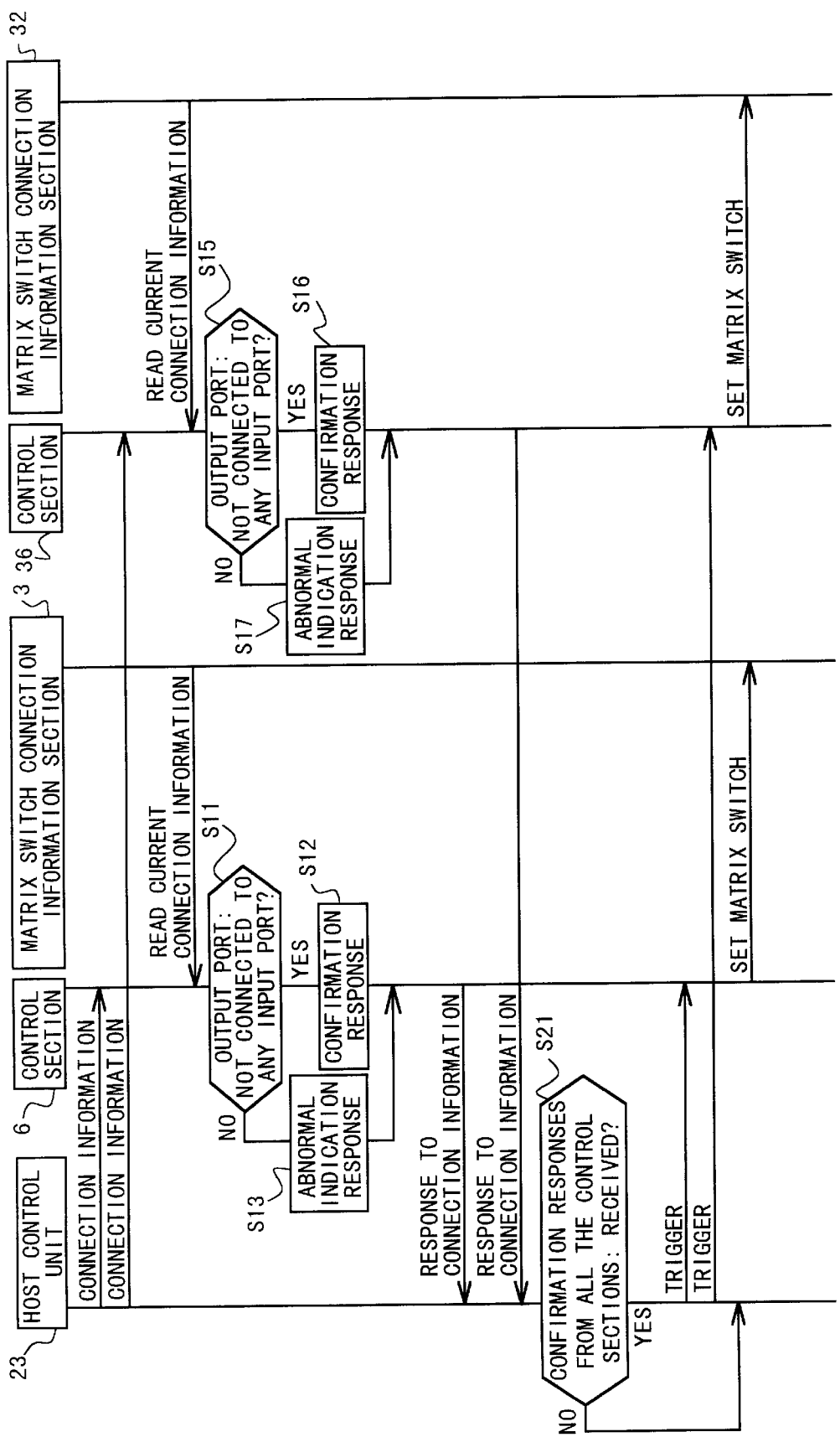
FIGS. 8 and 9 are flow charts illustrating the operations of the cross connect apparatus according to the second embodiment.

Next, the operation will be described. FIG. 8 illustrates the operation of cross connect apparatus 20 in a connecting operation. In the flow chart, signal flow is also illustrated in addition to the control flow. Referring to FIG. 8, new connection information or control information is externally inputted to the control section 42 of host control unit 23 via the interface section 41. The control section 42 stores the connection information in the memory 43. At the same time, the control section 42 supplies the connection information to the control section 6 of control 11 via the interface section 5 and to the control section 36 of control unit 22 via the interface section 35. The control sections 6 and 36 issue read instructions to their respective connection information sections 3 and 32 to read current connection information indicative of the current connection states of respective switch sections 2 and 31 from the connection information sections 3 and 32, respectively. At a step S11, the control section 6 determines based on the read connection information whether the output port or output terminal of the switch section 2 designated by the new connection information externally supplied is not connected to any input port or input terminal. When it is confirmed at the step S11 that the designated output port or output terminal is not connected to any input port or input terminal, the operation proceeds to a step S12. At the step S12, the control section 6 outputs a confirmation response to the control section 42 of the host control unit 23. If it is not confirmed, the operation proceeds to a step S13. At the step S13, an abnormal state indication response is generated and outputted to the control section 42 of the host control unit 42. Similarly, at a step S15, the control section 36 determines based on the read connection information whether the output port or output terminal of the switch section 31 designated by the new connection information externally supplied is not connected to any input port or input terminal. When it is confirmed at the step S15 that the designated output port or output terminal is not connected to any input port or input terminal, the operation proceeds to a step S16. At the step S16, the control section 36 outputs a confirmation response to the control section 42 of the host control unit 23. If it is not confirmed, the operation proceeds to a step S17. At the step S17, an abnormal state indicating response is generated and outputted to the control section 42 of the host control unit 42. At a step S21, the control unit 42 determines whether the confirmation responses are received from all the control sections 6 and 36. When it is confirmed that the confirmation responses are received from all the control sections 6 and 36, the control section 42 replies a confirmation response to the external unit via the interface section 41 and issues trigger signals as connection control data to the control sections 6 and 36, respectively. The control sections 6 and 36 control the connection information section 3 to establish new connection states of the switch sections 2 and 31, i.e., to connect between the input terminal and the output terminal(s), respectively. If it is not confirmed at the step S21, the new connection information is discarded.

Figure 9:
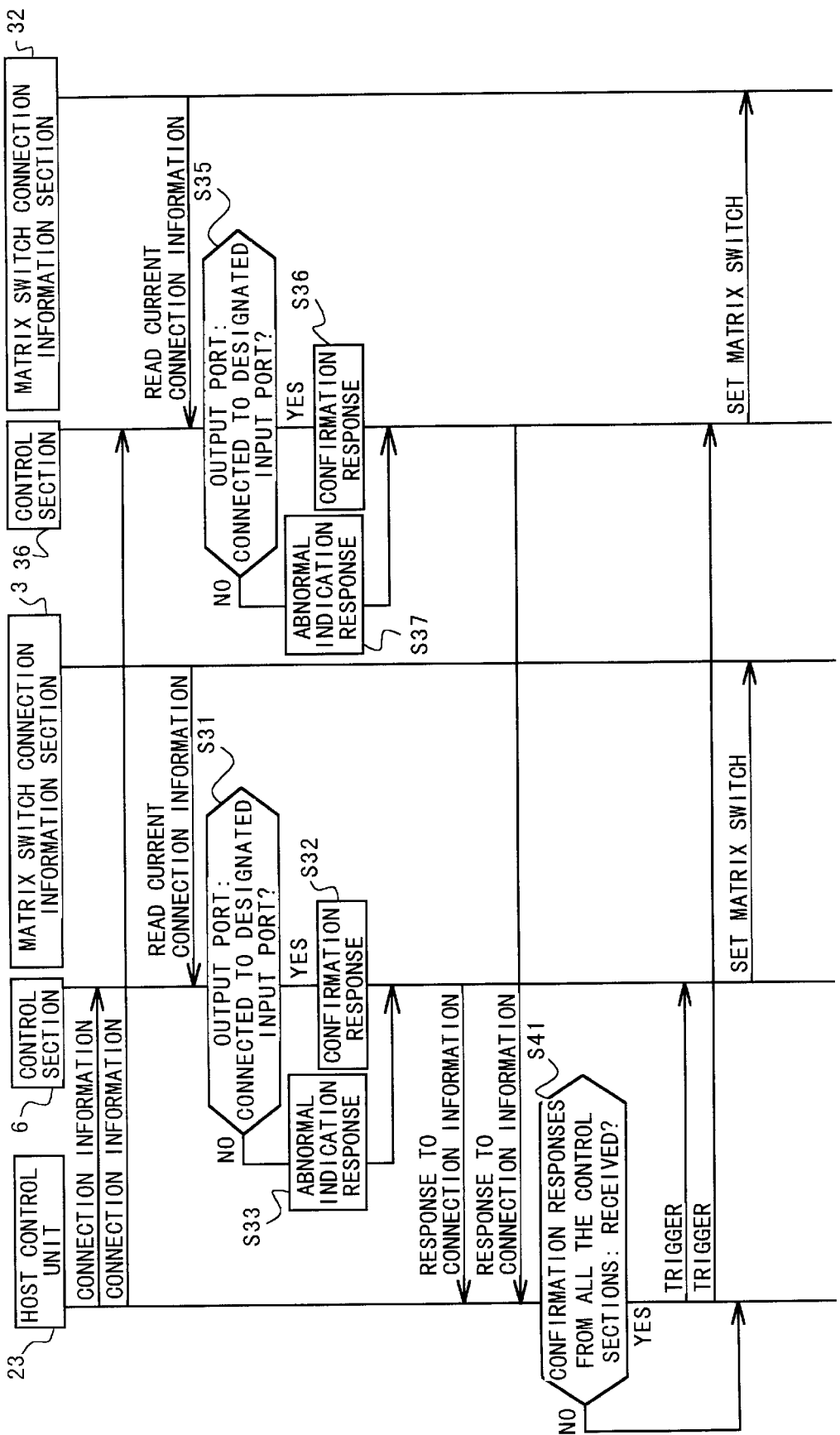

Next, the operation of the cross connect apparatus in the disconnect control will be described with reference to FIG. 9. The operation from when a new connection information is received by the host control unit 23 to when the current connection information is read from the connection information sections 3 and 32 is the same as in the connecting control. At the step S31, the control section 6 determines, based on the read current connection information, whether an output port and input port designated by the new connection information are connected in the switch section 2. If it is confirmed that the output port and input port designated by the new connection information are connected, the operation proceeds to the step S32. At the step S32, the control section 6 supplies a confirmation response to the control section 42 of the host control unit 23. If it is not confirmed, the control section 6 generates the abnormal state indicating response at a step S33 to output to the control section 42. Similarly, at the step S35, the control section 36 determines, based on the read current connection information, whether an output port and input port designated by the new connection information are connected in the switch section 31. If it is confirmed that the output port and input port designated by the new connection information are connected, the operation proceeds to the step S36. At the step S36, the control section 36 supplies a confirmation response to the control section 42 of the host control unit 23. If it is not confirmed, the control section 36 generates the abnormal state indicating response at a step S37 to output to the control section 42. At a step S41, the control unit 42 determines whether the confirmation responses are received from all the control sections 6 and 36. When it is confirmed that the confirmation responses are received from all the control sections 6 and 36, the control section 42 replies a confirmation response to the external unit via the interface section 41 and issues trigger signals as connection control data to the control sections 6 and 36, respectively. The control sections 6 and 36 control the connection information sections 3 and 32 to establish new connection states of the switch sections 2 and 31, i.e., to disconnect between the designated input terminal and output terminal, respectively. If it is not confirmed at the step S41, the new connection information is discarded.

Figure 10:
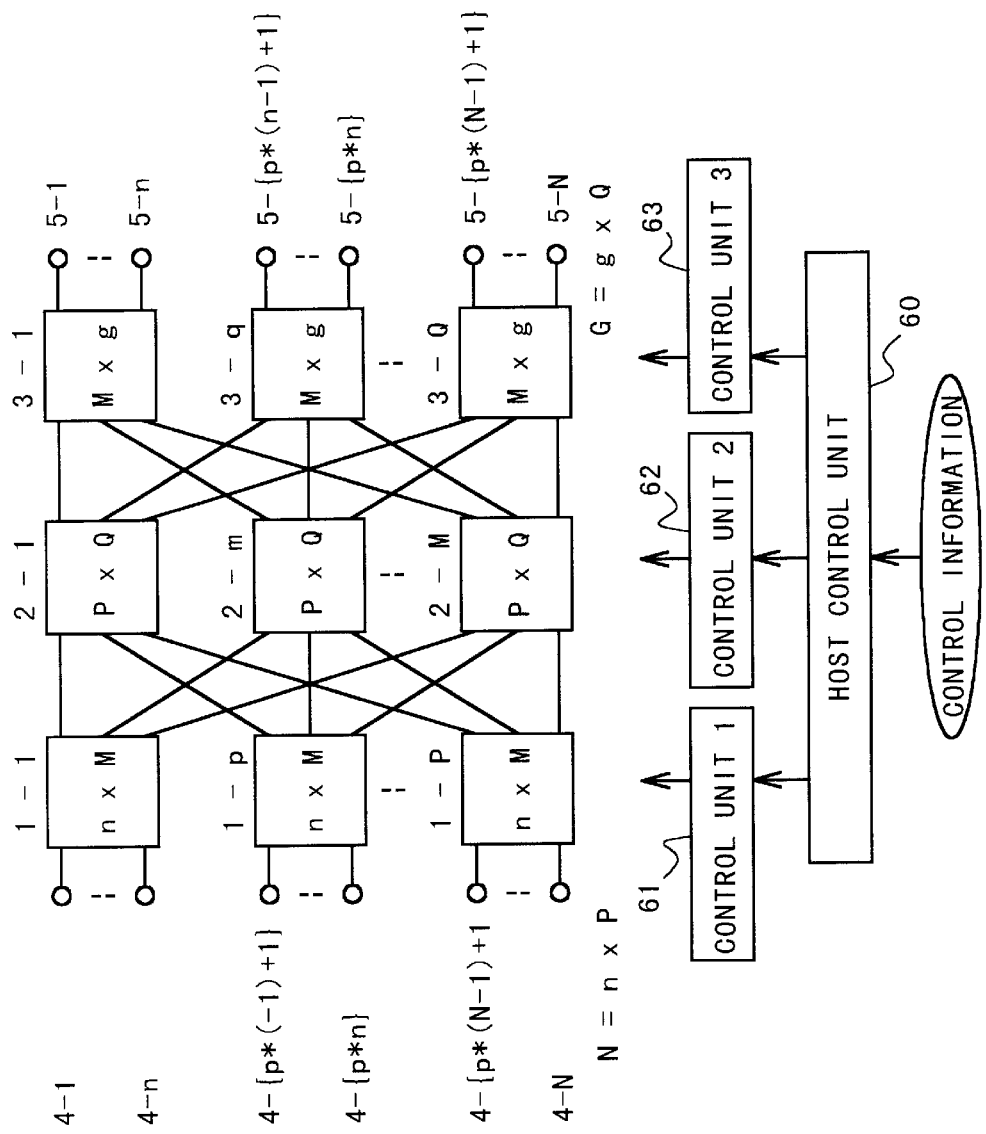
FIG. 10 is a diagram showing a control state in the cross connect apparatus of a third embodiment of the present invention.

Next, the cross connect apparatus according to the third embodiment of the present invention will be described with reference to FIG. 10. Referring to FIG. 10, the cross connect apparatus includes a three-stage matrix switch section. The three-stage matrix switch section is composed of P first stage matrix switch sections 1-1 to 1-P each having n inputs and M outputs and including a connection information section, M second stage matrix switch sections 2-1 to 2-M each having P inputs and Q outputs and including a connection information section, and Q third stage matrix switch sections 3-1 to 3-Q each having M inputs and g outputs and including a connection information section. In the figure, values of N, G, n, M and g can be arbitrarily determined on the basis of a desired size of switch. An m-th output ($1 \leq m \leq M$) of a p-th first stage matrix switch section ($1 \leq p \leq P$) can be connected to a p-th input ($1 \leq p \leq P$) of an m-th second stage matrix switch section ($1 \leq m \leq M$) and a q-th output ($1 \leq q \leq Q$) of an m-th second stage matrix switch section ($1 \leq m \leq M$) can be connected to an m-th input ($1 \leq m \leq M$) of a q-th third stage matrix switch section ($1 \leq q \leq Q$). The first stage matrix switch sections have N input terminals 4-1 to 4-N and the third stage matrix switch sections have N output terminals 5-1 to 5-N. The cross connect apparatus also includes P control units 61 for respectively controlling the first stage matrix switch sections 1-1 to 1-P, M control units 62 for respectively controlling the second stage matrix switch sections 2-1 to 2-M, Q control units 63 for respectively controlling the third stage matrix switch sections 3-1 to 3-Q, and a host control unit 60 for controlling the control units 61, 62 and 63. Note that in FIG. 10 a symbol "*" is used to indicate the size of matrix switch section and (a×b) indicates the number a of inputs and the number b of outputs.

Next, the operation of the cross connect apparatus according to the third embodiment will be described. In FIG. 10, assume that N=100, G=100, n=5, M=9 and g=5. Also, assume that the input terminal 4-3 is connected to the output terminal 5-3. For instance, this connection could be established by connecting the third input of first stage matrix switch section 1-1 to the first output of the first stage matrix switch section 1-1, connecting the first input of the second stage matrix switch section 2-1 to the first output thereof, and connecting the first input of the third stage matrix switch section 3-1 to the third output thereof. Further, assume that the control units 61, 62 and 63 all erroneously discard the connection information. In this state, if the host control unit 60 receives new connection information as a connection command that the input terminal 4-7 should be connected to the output terminal 5-2, the host control unit 60 would output the new connection information to the control unit 61 for the first stage matrix switch section 1-2 such that the second input of the first stage matrix switch section 1-2 is connected to the first output thereof, new connection information to the control unit 62 for the second stage matrix switch section 2-1 such that the first input of the second stage matrix switch section 2-1 is connected to the first output thereof, and new connection information to the control unit 63 for the third stage matrix switch section 3-1 such that the first input of the third stage matrix switch section 3-1 is connected to the second output thereof, for example. In this case, however, the control unit 62 for the second stage matrix switch section 2-1 detects that the first output of the second stage matrix switch section 2-1 is already connected to the first input thereof and informs to the host control unit 60 that the connection information is erroneous. Thereby, the already set routed path can be protected, in the same manner as described above.

Figure 11:
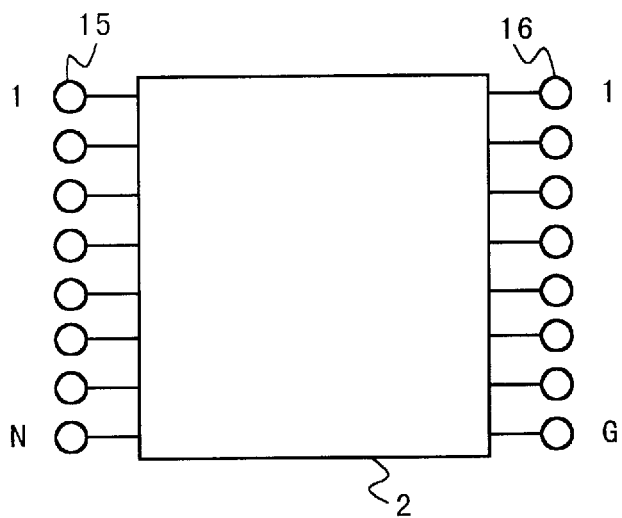
FIGS. 11, 12A, 12B and 13 are diagrams illustrating a switch section.
Figure 12A:
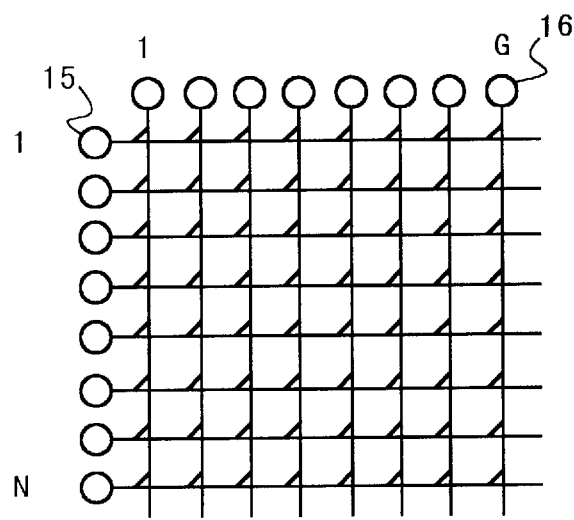
Figure 12B:
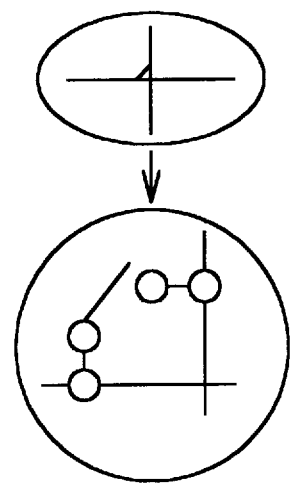
Figure 13:
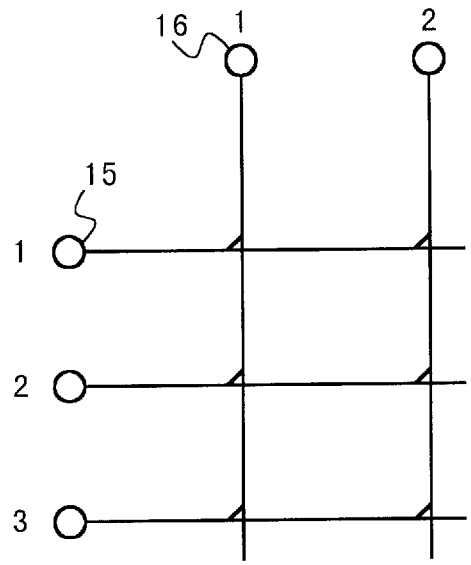
Figure 14:
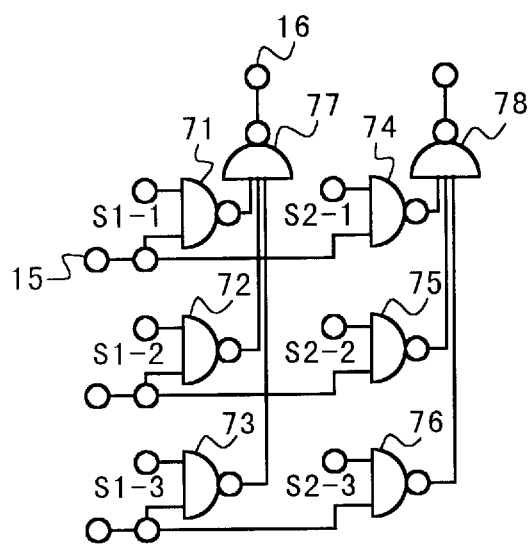
FIG. 14 is a circuit diagram of the switch section.

Next, the matrix switch section 10 including the switch section 2 and the connection information section 3 as shown in FIG. 4 will be described. FIG. 11 is an external view of the switch section 2 and FIG. 12A is a schematic diagram of the switch section 2. As seen from FIG. 11, the switch 2 is constructed of an IC. In the figure, the input terminals 15 are provided on the left-hand side and the output terminals are provided on the right-hand side. As shown in FIG. 12A, the internal structure of the switch section 2 is in a matrix manner and each of the switches is shown in FIG. 12B. FIG. 13 is an expanded diagram of part of the switch section 2 and FIG. 14 is a circuit diagram of the part of switch section 2 shown in FIG. 13. As shown in FIG. 14, six NAND gates 71- to 76 are provided for three input terminals 15 and two NAND gates are provided for two output terminals 16. A control signal S1-1, S1-2, . . . , or S2-3 is supplied to one input of each of the NAND gates 71 to 76 and a line signal is supplied to the other input thereof. If any of the control signals S1-1 to S1-3 is set to a high level, the corresponding NAND gate opens so that the line signal is outputted via the corresponding NAND gate and the NAND gate 77. Similarly, if any of the control signals S2-1 to S2-3 is set to a high level, the corresponding NAND gate opens so that the line signal is output via the corresponding NAND gate and the NAND gate 78.

Figure 15:
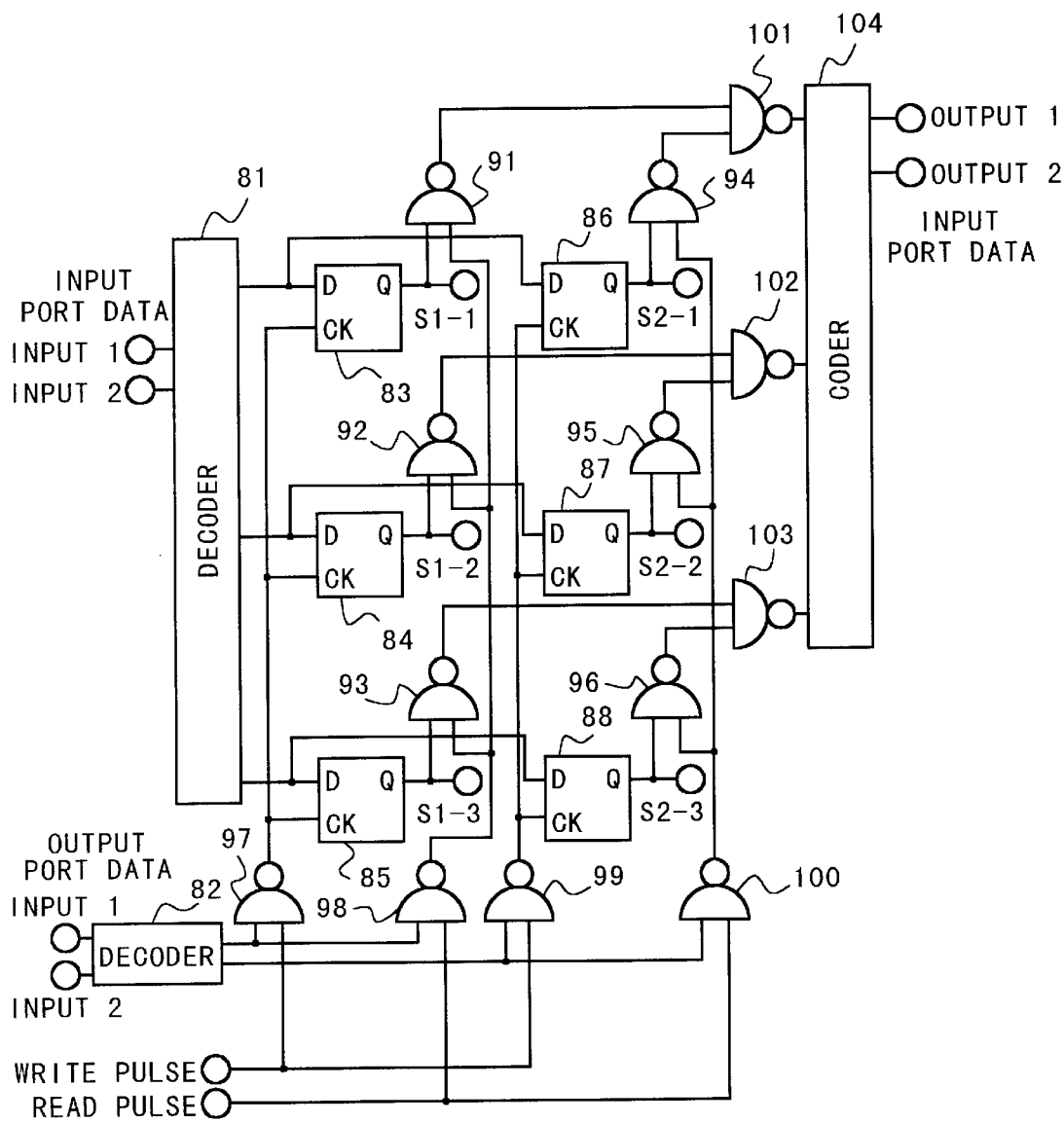
FIG. 15 is a block diagram illustrating a connection information section.

Next, the connection information section 3 will be described. FIG. 15 is a block diagram illustrating the connection information section 3. Referring to FIG. 15, the connection information section 3 is composed of decoders 81 and 82, D-type flip-flops 83 to 88, NAND gates 91 to 103 and a coder 104. In a write operation of the connection information, data of an input terminal is supplied to inputs 1 and 2 of the decoder 81. In a read operation of the connection information, data of an input port is outputted from outputs 1 and 2 of the coder 104. Data of an output port is supplied to inputs 1 and 2 of the decoder 82. A read pulse is supplied from the control unit 6 to the NAND gates 98 and 100 and a write pulse is supplied from the control unit 6 to the NAND gates 97 and 99.

Next, input and output relation will be described. When the inputs 1 and 2 of the decoder 81 are "0" and "1", "1", "0" and "0" are outputted to the flip-flops 83, 84 and 85. When the inputs 1 and 2 of the decoder 81 are "1" and "0", "0", "1" and "0" are outputted to the flip-flops 83, 84 and 85. When the inputs 1 and 2 of the decoder 81 are "1" and "1", "0", "0" and "1" are outputted to the flip-flops 83, 84 and 85. That is, only one output is "1" for any input to the decoder 81. With the coder 104, when the outputs of NAND gates 101, 102 and 103 are "1", "0" and "0", "0" and "1" are outputted from the outputs 1 and 2 of the coder 104. When the outputs of NAND gates 101, 102 and 103 are "0", "1" and "0", "1" and "0" are outputted from the outputs 1 and 2 of the coder 104. When the outputs of NAND gates 101, 102 and 103 are "0", "0" and "1", "1" and "1" are outputted from the outputs 1 and 2 of the coder 104. The write pulse and read pulse are both active low and the other signals are active high. The current connection information is read in response to the read pulse and the new connection information is written in response to the write pulse.

Next, the write operation will be described. The data of an input terminal of the connection information is supplied to the inputs 1 and 2 of the decoder 81 and the data of an output terminal of the connection information is supplied to the inputs 1 and 2 of the decoder 82. One of the D-type flip-flops 83 to 88 is selected in accordance with a combination of the data of an input terminal and the data of an output terminal and the connection information is set in the selected flip-flop in response to the write pulse. The selected flip-flop outputs a high level signal and the other flip-flops output a low level signal. The outputs S1-1 to S2-3 of the flip-flops 83 to 88 are supplied to the switches of the switch section 2, respectively. As a result, a switch is connected.

On the other hand, in the read operation, the data of an output terminal of the connection information is supplied to the inputs 1 and 2 of the decoder 82. One of the columns of D-type flip-flops 83 to 85 and 86 to 88 is selected in accordance with the output of the decoder 82 and the connection information is read from the selected column of flip-flops in response to the read pulse and supplied to the coder 104 via the NAND gates 101 to 103. The coder 104 outputs the data of an input terminal which is supplied to the control section 6 (FIG. 4).

As described above, according to the present invention, even if either of the control section or the control unit is in a failure state or the connection information is lost, erroneous connection or disconnection can be prevented and the routed path already set can be protected.

What is claimed is:

1. A cross connect apparatus comprising:
    a switch section including a plurality of switches and having n input terminals and m output terminals connected in a current connection state;
    a connection establishing section controlling said current connection state of said switch section in response to connection control information and providing current connection status information;
    a connection control section receiving a connection command indicating new connection information corresponding to a requested new connection state and, in response;
        storing said new connection information;
        reading said current connection status information;
        making a determination, based on said current connection status information, whether said requested new connection state is an allowed new connection state; and
        providing said connection control information so that said connection establishing section controls said current connection state to be said allowed new connection state.

2. A cross connect apparatus according to claim 1, wherein, when said requested new connection state includes a new connection between one of said n input terminals and k output terminals of said m output terminals, said connection control section reads, for said k output terminals, said current connection status information and then makes said determination based on whether said current connection status information indicates that any of said k output terminals is already connected to any of said input terminals.

3. A cross connect apparatus according to claim 1, wherein, when said requested new connection state includes a new disconnection between one of said n input terminals and k output terminals of said m output terminals, said connection control section reads, for said k output terminals, said current connection status information and then makes said determination based on whether said current connection status information indicates that said k output terminals are connected to said one of said n input terminals.

4. A cross connect apparatus, comprising:
    a plurality of switch subsections, each having a respective plurality of switches, n input terminals, and m output terminals, said respective plurality of switches for each of said plurality of switch subsections defining a respective current connection state;
    a plurality of connection establishing subsections respectively provided for said plurality of switch subsections, each of said connection establishing subsections controlling said respective current connection state of said respective switch subsection in response to respective connection control information, and each of said connection establishing subsections providing respective current connection status information;
    a main control section receiving a connection command indicating new connection information corresponding to a requested new connection state; and
    a plurality of connection control subsections respectively provided for said plurality of connection establishing subsections and each, in response to receiving said new connection from said main control section;
        storing said new connection information,
        reading said respective current connection status information for said corresponding switch subsection,
        making a respective determination, based on said respective current connection status information, whether said requested new connection state is an allowed new connection state, and
        providing said respective determination to said main control section;
    wherein, when said respective determination from each of said plurality of connection control subsections indicates that said requested new connection state is an allowed new connection state, said main control section provides to said plurality of connection control subsections said respective connection control information so that said corresponding connection establishing section controls said respective current connection state to correspond to said allowed new connection state.

5. A cross connect apparatus according to claim 4, wherein, when said requested new connection state includes a new connection between one of said input terminals and one or more of said output terminals, each of said plurality of connection control subsections reads said respective current connection status information and then makes said respective determination based on whether any of said one or more output terminals of said corresponding switch subsection is already connected to any of said input terminals.

6. A cross connect apparatus according to claim 4, wherein, when said requested new connection state includes a new disconnection between one of said input terminals and one of said output terminals, each of said connection control subsections reads said respective current connection status information and then makes said respective determination based on whether an output terminal of said corresponding switch subsection designated by the connection command is connected to an input terminal designated by the connection command.

7. A method of protecting a connection state in a cross connect apparatus, comprising the steps of:

receiving a connection command indicating a new requested connection state of a switch section;

obtaining current connection status information;

making a determination, based on said current connection status information, whether said new requested connection state is an allowed connection state; and when said determination is that said new requested connection state is an allowed connection state, providing connection control information to a circuit that establishes said allowed connection state in said switch section, and when said determination is that said new requested connection state is not an allowed connection state, disregarding said connection command;

wherein said current connection status information is obtained from said circuit that establishes said allowed connection state in said switch section.

8. A method according to claim 7, wherein said step of receiving includes said connection command designating connection between one of a plurality of input terminals and one or more of a plurality of output terminals in said switch section.

9. A method according to claim 7, wherein said step of receiving includes said connection command designating disconnection between one of a plurality of input terminals and one or more of a plurality of output terminals in said switch section.

10. A method according to claim 7, wherein said obtaining step includes:

issuing a read command to each of a plurality of connection control subsections in response to said receiving of said connection command; and reading said current connection status information from a corresponding one of a plurality of connection establishing subsections defining said circuit that establishes said allowed connection state.

11. A method according to claim 7, wherein said step of making a determination includes:

determining, for each of a plurality of switch subsections of said switch subsection, based on said obtained current connection status information, whether establishment of the new requested connection state is allowed;

issuing a response, from each of a plurality of connection control subsections to a main control section, when said establishment is determined to be allowed; and determining in the main control section, whether said response is received from each of the ones of said plurality of connection control subsections associated with the connection command.

12. A method according to claim 11, wherein said establishment of said allowed connection state includes the steps of:

issuing connection control data from said main control section to said plurality of connection control subsections; and outputting new connection information from each of the plurality of connection control subsections to a corresponding one of a plurality of connection establishing subsections such that the corresponding connection establishing subsection establishes the allowed connection state in a corresponding one of a plurality of switch subsections of the switch section in accordance with the connection command.

* * * * *